J. G. HART.
Automatic-Brake for Wagons.
No. 210,030.  Patented Nov. 19, 1878.
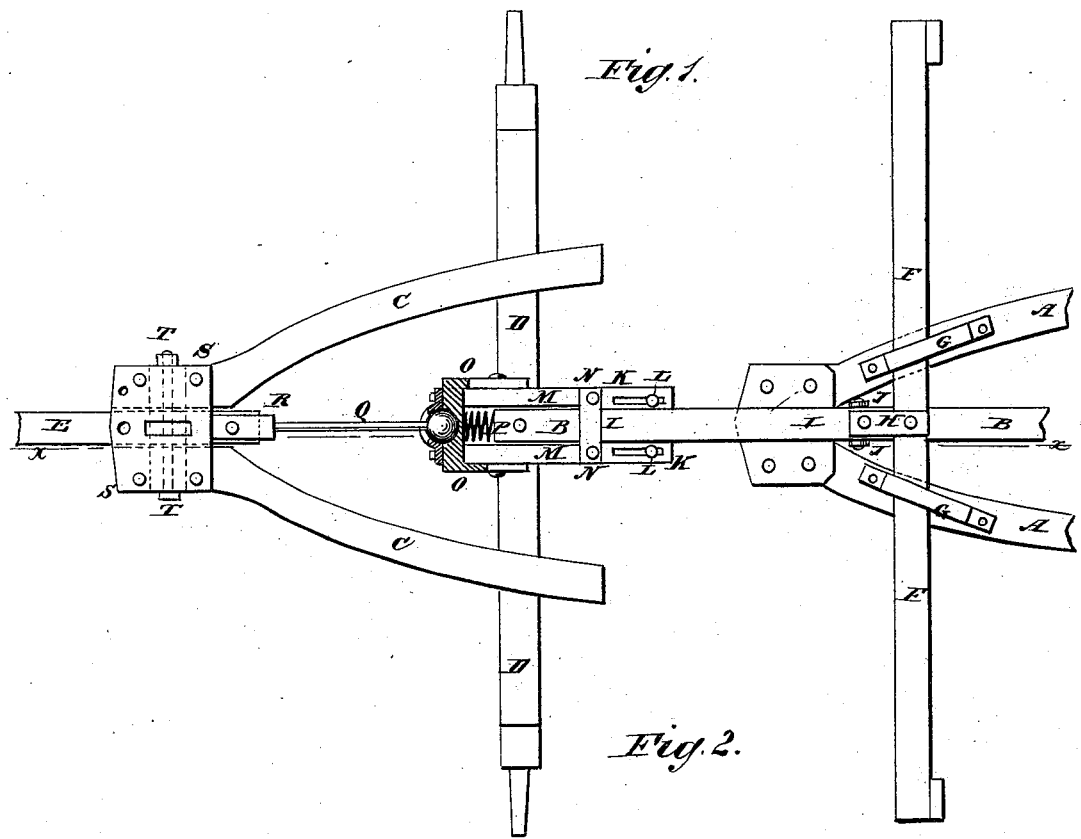
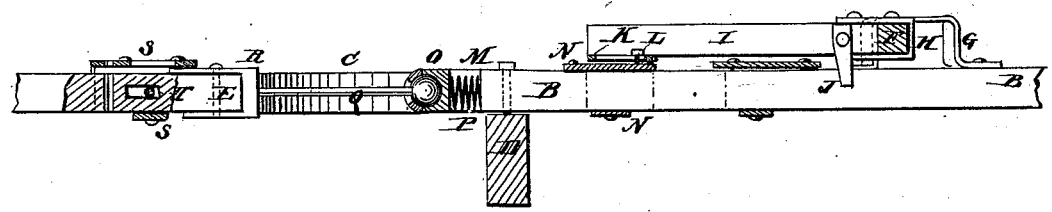
WITNESSES:
Francis McArdle.
C. Sedgwick
INVENTOR:
J. G. Hart
BY Munn & Co
ATTORNEYS.

UNITED STATES PATENT OFFICE.

JAMES G. HART, OF MURRAY, KENTUCKY.

IMPROVEMENT IN AUTOMATIC BRAKES FOR WAGONS.

Specification forming part of Letters Patent No. 210,030, dated November 19, 1878; application filed September 24, 1878.

*To all whom it may concern:*

Be it known that I, JAMES G. HART, of Murray, in the county of Calloway and State of Kentucky, have invented a new and useful Improvement in Wagon-Brakes, of which the following is a specification:

Figure 1 is a top view of my improved brake. Fig. 2 is a vertical longitudinal section of the same, taken through the line $x\,x$, Fig. 1.

Similar letters of reference indicate corresponding parts.

The object of this invention is to furnish an improved brake for wagons and other vehicles which shall be so constructed that the brake will be applied by the forward pressure of the vehicle in going down hill, and which shall be simple in construction and conveniently applied to the vehicle.

A represents the rear hounds, B the reach, C the forward hounds, D the forward axle, and E the tongue, of a wagon-gearing, about the construction of which parts there is nothing new.

F is the brake-bar, to the rear side of the ends of which the brake-shoes are applied in the usual way. The brake-bar F rests upon the rear hounds, A, and slides forward and back in keepers G attached to the said hounds A.

To the center of the brake-bar F is attached, by a U-strap, H, the rear end of a bar, I, which passes forward along the upper side of the reach B, and is kept in position upon the said reach, holding the brake-bar F from longitudinal movement, by short straps J attached to its sides, and which project downward upon the opposite sides of the reach B.

To the lower side of the forward end of the bar I is secured a plate, K, the side parts of which project at the sides of the said bar I, and are slotted to receive the bolts L, by which the said plate is secured to the rear ends of the two bars M. The bars M are placed upon the opposite sides of the forward part of the reach B, and their rear ends are connected by plates N upon the upper and lower sides of the said reach B.

The bars M project in front of the forward end of the reach B, and their forward ends are connected by a U-strap, O, between the bend of which and the forward end of the said reach B is placed a spiral spring, P, the elasticity of which withdraws the brake-bar from the wheels when the pressure that applies the brakes is removed.

To the bend of the U-strap O is connected by a ball-and-socket joint the rear end of a rod, Q, the forward end of which is connected by a U-strap, R, with the rear end of the tongue E, said connection likewise being a universal joint. The tongue E is placed between the forward ends of the forward hounds C, and between the plates S, attached to the upper and lower sides of the ends of the said hounds, where it is secured in place by a bolt, T, passing through it and through the said hounds.

The tongue E or the hounds C are slotted to receive the bolt T, to give the said tongue E the necessary longitudinal play.

The plate S is slotted to receive the doubletree bolt, so that the said bolt will not interfere with the longitudinal play of the tongue. A hole is formed through the plate S and the tongue E to receive a pin or ratchet when it is necessary to back the wagon without applying the brake, the said pin, when not required for use, being carried in a hole through the plate S and the forward end of one of the hounds C.

With this construction, the forward pressure of the wagon and its load, in going down hill, causes the wagon to move forward upon the tongue E, and thus applies the brakes, the said brakes being withdrawn, when the forward pressure is removed, by the draft or by the spring P.

Having thus described my invention, I claim as new and desire to secure by Letters Patent—

1. The bar I, connected by strap H with the brake-bar F, and with the reach by straps J, as and for the purpose described.

2. The plate K, having slotted side parts, the connected side bars M, having bolts L, the U-strap O, and the spring P, combined and arranged in a wagon-brake, as and for the purpose specified.

JAMES GLENN HART.

Witnesses:
W. T. SCOTT,
JAS. R. SPILMAN.